United States Patent
Garre (10) Patent No.: US 10,515,642 B2
(45) Date of Patent: Dec. 24, 2019

(54) USING BANDWIDTH ALLOCATION DATA TO DETERMINE A BREAKDOWN OF VOLTE CALLS BY AMR CODING MODE

(71) Applicant: T-Mobile USA, Inc., Bellevue, WA (US)

(72) Inventor: Rajesh Garre, Redmond, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 104 days.

(21) Appl. No.: 15/793,798

(22) Filed: Oct. 25, 2017

(65) Prior Publication Data

US 2018/0047398 A1 Feb. 15, 2018

Related U.S. Application Data

(63) Continuation of application No. 14/931,713, filed on Nov. 3, 2015, now Pat. No. 9,812,134.

(51) Int. Cl.
| | |
|---|---|
| *H04W 72/08* | (2009.01) |
| *G10L 19/002* | (2013.01) |
| *H04W 4/16* | (2009.01) |
| *G10L 19/00* | (2013.01) |
| *G10L 19/22* | (2013.01) |
| *G10L 19/24* | (2013.01) |

(52) U.S. Cl.
CPC ........ *G10L 19/002* (2013.01); *G10L 19/0019* (2013.01); *H04W 4/16* (2013.01); *H04W 72/087* (2013.01); *G10L 19/22* (2013.01); *G10L 19/24* (2013.01)

(58) Field of Classification Search
CPC ... H04W 72/087; H04W 4/16; H04W 84/045; G10L 19/002
See application file for complete search history.

(56) References Cited

U.S. PATENT DOCUMENTS

| | | | |
|---|---|---|---|
| 2006/0062208 A1 | 3/2006 | Li et al. | |
| 2007/0189272 A1 | 8/2007 | Hutchinson et al. | |
| 2015/0263896 A1* | 9/2015 | Poulin | H04L 41/0813 709/226 |
| 2015/0304865 A1 | 10/2015 | Poscher | |
| 2016/0088459 A1 | 3/2016 | Jiang | |
| 2017/0104795 A1 | 4/2017 | Gundavelli et al. | |
| 2017/0125021 A1 | 5/2017 | Garre | |

* cited by examiner

*Primary Examiner* — Jamal Javaid
(74) *Attorney, Agent, or Firm* — Lee & Hayes, P.C.

(57) ABSTRACT

A breakdown of voice over long term evolution (VoLTE) calls by adaptive multi-rate (AMR) speech coding mode may be determined by accessing a plurality of call detail records (CDRs) containing information associated with a plurality of corresponding communication sessions established over a mobile telephony network, and filtering the plurality of CDRs to obtain a subset of CDRs that are associated with communication sessions that used VoLTE services. A data structure containing correlations between AMR speech coding modes and bandwidth values may be referenced in order to classify the CDRs of the subset of CDRs into groups of different AMR speech coding modes. In some embodiments, a capacity planning metric or a resource allocation metric may be recommended based at least in part on numbers of the CDRs in the subset of CDRs within each of the groups of the different AMR speech coding modes.

20 Claims, 5 Drawing Sheets

USING BANDWIDTH ALLOCATION DATA TO DETERMINE A BREAKDOWN OF VOLTE CALLS BY AMR CODING MODE

CROSS REFERENCE TO RELATED APPLICATIONS

This is a continuation application which claims priority to commonly assigned, co-pending U.S. patent application Ser. No. 14/931,713, filed Nov. 3, 2015. Application Ser. No. 14/931,713 is fully incorporated herein by reference.

BACKGROUND

The fourth generation (4G) Long Term Evolution (LTE) standard is based on packet-switched Internet Protocol (IP) networking. User equipments (UEs) that are 4G LTE-compliant are configured to provide voice communication capabilities over 4G LTE networks using a packet-based protocol, such as the voice over LTE (VoLTE) protocol. The VoLTE protocol dedicates a particular speech codec for encoding and decoding audio, thereby allowing two or more people to talk to each other over a mobile telephony network using respective user equipment (UE). The $3^{rd}$ Generation Partnership Project (3GPP) standard specifies speech codecs that are to be used in the provisioning of VoLTE services over mobile telephony networks. Adaptive Multi-Rate (AMR) codec is one such speech codec that supports eight narrow band (i.e., 300 to 3400 Hertz (Hz)) speech coding modes with respective bit rates between 4.75 and 12.2 kilobits per second (kbps). AMR Wideband (AMR-WB) is another speech codec that supports nine wide band speech coding modes with respective bit rates between 6.6 and 23.85 kbps. Table 1, below, provides the nine wide band speech coding modes supported by AMR-WB:

TABLE 1

AMR-WB Speech Coding Modes

| AMR-WB Coding Mode | Bit Rate (kbps) | # of Bits in 20 millisecond frame |
| --- | --- | --- |
| 0 | 6.6 | 132 |
| 1 | 8.85 | 177 |
| 2 | 12.65 | 253 |
| 3 | 14.25 | 285 |
| 4 | 15.85 | 317 |
| 5 | 18.25 | 365 |
| 6 | 19.85 | 397 |
| 7 | 23.05 | 461 |
| 8 | 23.85 | 477 |

AMR-WB provides improved speech quality, as compared to its narrowband counterpart (AMR), due to a wider frequency band of 50 to 7000 Hz, which allows for new wideband audio technologies, such as high definition (HD) voice (sometimes referred to as "HD calling"). HD voice provides clearer-sounding calls and a decrease in background noise (e.g., street traffic, wind, crowd noise, etc.) as compared to non-HD calling. Notwithstanding the carrier implementation of HD voice, however, not all VoLTE traffic is actually encoded/decoded using the available AMR-WB codec. This is primarily due to the fact that not all UEs are capable of utilizing the AMR-WB codec for speech encoding/decoding. For example, a VoLTE capable UE may call a landline or an older, legacy UE that is incapable of handling HD calling using the AMR-WB codec. As a result, some communication sessions end up being "renegotiated" to a narrowband speech codec (e.g., AMR) in order to establish a voice communication session. Carriers (or cellular network operators) that provide HD voice services typically lack insight into the proportion of their customers' calls that actually utilize AMR-WB (HD voice), which is a potentially valuable insight.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and systems for determining a breakdown of voice over long term evolution (VoLTE) calls by adaptive multi-rate (AMR) speech coding mode. According to various embodiments, call detail records (CDRs) are obtained and stored by components of an evolved packet core (EPC) as communication sessions occur over a mobile telephony network. The CDRs may contain information associated with a plurality of communication sessions established over the mobile telephony network, including information pertaining to an amount of bandwidth allocated for each of the communication sessions. The CDRs are accessed and filtered to obtain a subset of the CDRs that are ultimately used for determining the breakdown of VoLTE calls by AMR speech coding mode. By filtering out irrelevant ones of the CDRs, a subset of CDRs that are associated with communication sessions that used VoLTE services may be obtained. A data structure containing correlations between AMR speech coding modes and bandwidth values may be accessed to determine how to classify the subset of CDRs into groups of different AMR speech coding modes. Once classified, a number of CDRs within each of the groups of different AMR speech coding modes may be determined. In some embodiments, a recommendation may be output based on the classified CDRs, such as a recommended capacity planning metric or a recommended resource allocation metric.

In some embodiments, a process for determining a breakdown of VoLTE calls by AMR speech coding mode includes accessing a plurality of CDRs containing information associated with a plurality of corresponding communication sessions established over a mobile telephony network, and filtering the plurality of CDRs to obtain a subset of CDRs that are associated with communication sessions that used VoLTE services. The process may proceed by referencing a data structure containing correlations between AMR speech coding modes and bandwidth values, and classifying the CDRs of the subset of CDRs into groups of different AMR speech coding modes based at least in part on the referencing. In some embodiments, the process includes recommending a capacity planning metric or a resource allocation metric based at least in part on numbers of the CDRs in the subset of CDRs within each of the groups of the different AMR speech coding modes.

Also disclosed herein are systems comprising one or more processors and one or more memories, as well as non-transitory computer-readable media storing computer-executable instructions that, when executed, by one or more processors perform various acts and/or processes disclosed herein.

By determining a breakdown of VoLTE calls by AMR speech coding mode, resource allocation and/or capacity planning recommendations may be determined, which provides for configuring and/or planning a more reliable and efficient cellular network. For example, a carrier may gain insight into the proportion or percentage of VoLTE calls that use the AMR-WB codec, and in response, the carrier can optimally plan for, and/or configure, a mobile telephony network to provide a requisite amount of bandwidth to its customers, which, in turn, provides a more reliable and efficient mobile telephony network.

Example Environment

Although the techniques and systems disclosed herein are predominantly described with respect to 4G LTE networks, it is to be appreciated that the techniques and systems described herein may be implemented in any future cellular network (e.g., a fifth generation (5G) network). Thus, LTE, as it is used herein, may refer to current releases of LTE protocol, or any future evolution of LTE.

Figure 1:
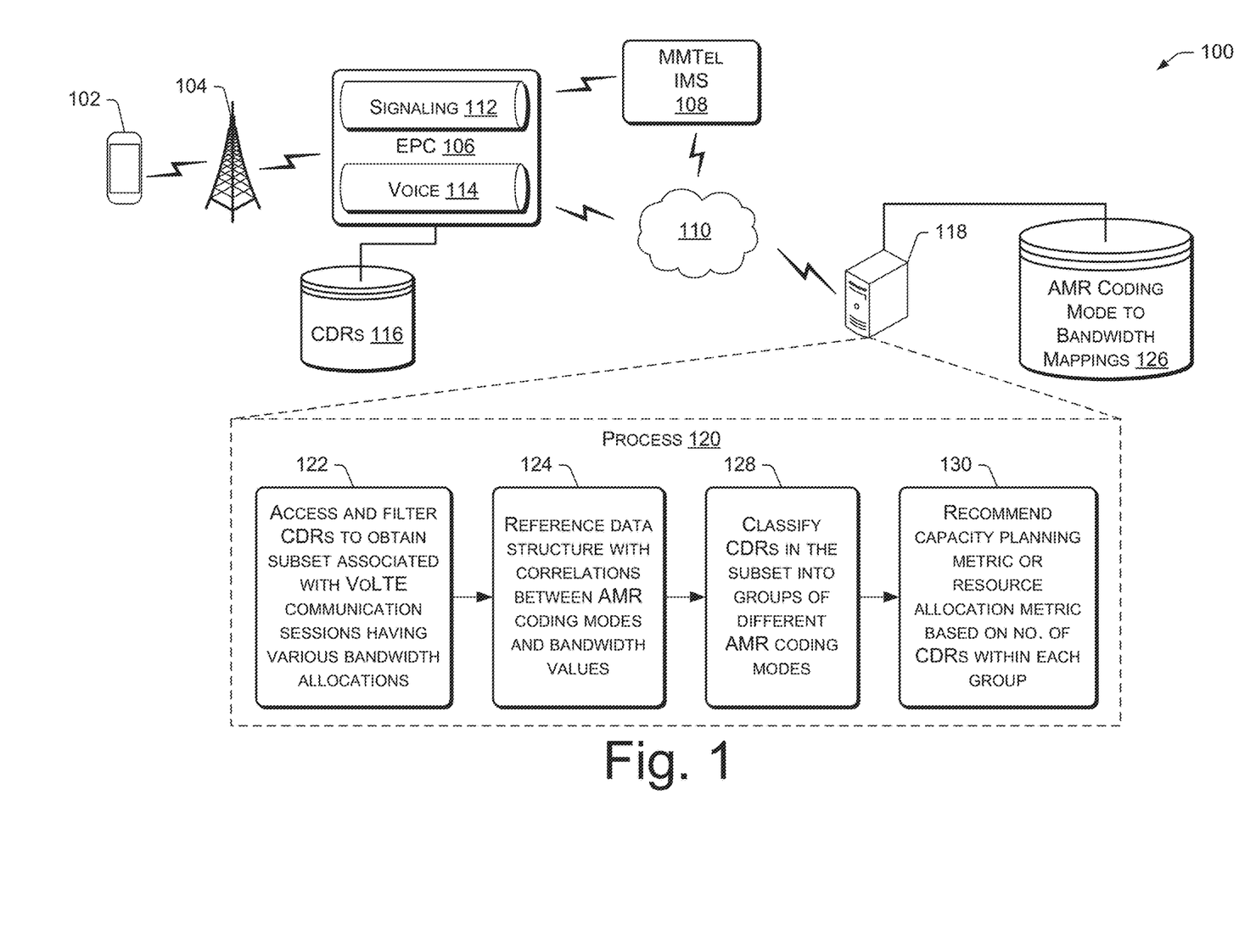
FIG. 1 illustrates an example cellular network environment for implementing the techniques described herein, including techniques for determining a breakdown of voice over long term evolution (VoLTE) calls by adaptive multi-rate (AMR) speech coding mode.

FIG. 1 illustrates an example cellular network environment 100 that supports wireless communications between multiple user equipments (UEs), such as the UE 102 (e.g., a mobile device), and various network components of a mobile telephony network. FIG. 1 illustrates at least some of the components of a network architecture responsible for implementing VoLTE services within the environment 100.

The UE 102 may be implemented as any suitable computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), and/or any similar computing device. In accordance with various embodiments described herein, the terms "wireless communication device," "wireless device," "communication device," "mobile device," and "user equipment (UE)" may be used interchangeably herein to describe any UE 102 capable of communicating over a wireless network and configured to VoLTE services, as described herein. It is to be appreciated that the UE 102 may be capable of communicating wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, and/or any future IP-based network technology or evolution of an existing IP-based network technology.

The UE 102 may be attached to a mobile telephony network through a base station 104 (sometimes referred to as a "cell site 104") that is configured to receive, process, and/or transmit traffic, such as voice or video calls, audio, video, text (e.g., Short Message Service (SMS)), and/or other data, to be sent to and/or received from the UE 102. In some embodiments, the base station 104 may comprise an eNodeB. The base station 104 may communicate with the UE 102 over radio interfaces to form a radio access network (RAN) that is configured to employ any suitable radio access technology (RAT), such as an LTE RAT, as well as one or more additional RAT types (e.g., legacy RATs, such as a 3G RAT, 2G RAT, etc.). Accordingly, the base station 104 may be capable of communicating wirelessly using any suitable wireless communications/data technology, protocol, or standard, such as GSM, TDMA, UMTS, EVDO, LTE, LTE+, GAN, UMA, CDMA, OFDM, GPRS, EDGE, AMPS, HSPA, HSPA+, VoIP, VoLTE, Institute of Electrical and Electronics Engineers (IEEE) 802.1x protocols, WiMAX, wireless fidelity (Wi-Fi™), and/or any future IP-based network technology or evolution of an existing IP-based network technology.

FIG. 1 illustrates a cellular network environment 100 that is configured to enable both voice and data communication sessions for UEs, such as the UE 102. In some embodiments, the environment 100 may include an evolved packet core (EPC) 106, a multimedia telephony (MMTel) and IP Multimedia Subsystem (IMS) architecture 108, and a packet data network(s) 110. The network(s) 110 may include, without limitation, a cable network, the Internet, a local area network, a mobile telephone network, wide area networks and wireless networks, or any portion and/or combination of such networks. In general, the EPC 106 is configured to provide a LTE network, and the MMTel and IMS architecture 108 is configured to provide IP multimedia services.

When the UE 102 initiates a telephone call to call another UE, the telephone call may be completed by the mobile telephony network using VoLTE protocol. Initially, when the UE 102 is turned on, the UE 102 attaches to the base station 104 to establish a radio link with the base station 104. Once attached, the UE 102 is said to be "camped on" the cell that is associated with the base station 104. A voice communication session may be established using Session Initiation Protocol (SIP). SIP is a signaling protocol that can be used to establish, modify, and terminate multimedia sessions (e.g., a multimedia telephony call) over packet networks, and to authenticate access to IMS-based services. A SIP INVITE method may be transmitted from the UE 102 that specifies, among other things, the called party, a speech codec (e.g., Adaptive Multi-Rate (AMR), AMR Wideband (AMR-WB), etc.) to use for the voice communication session. The network may establish a dedicated EPC, such as the EPC 106, and a data radio bearer with a guaranteed bit rate (GBR) for voice traffic to/from the UE 102. FIG. 1 illustrates the SIP signaling traffic 112 and voice traffic 114 over a dedicated bearer of the EPC 106.

In some embodiments, the mobile telephony network in the environment 100 may use admission control to ensure that there are sufficient resources (e.g., physical radio equipment) and capacity for the network-requested voice bearer. This is why it is useful for a carrier to accurately plan for capacity and allocation of resources so that reliable service can be provided to customers of the carrier's telephony services. Once the call is established, IP packets may be sent from the UE 102 to transmit voice data over the mobile telephony network for a voice communication session.

The devices and/or networks shown in FIG. 1 are merely illustrative for explanatory purposes, and in practice, there may be additional or fewer devices and/or networks, different devices and/or networks, or the devices and/or networks may be provided in different arrangements. Furthermore, the techniques described herein may be performed by a single device, or a combination of devices, and the devices described herein may be coupled together wirelessly or via a wired connection, or a combination thereof.

When a voice communication session is initiated by the UE 102 using VoLTE protocol, components of the EPC 106, such as a packet data network gateway (PGW), may collect information related to the voice communication session and may store this information in the form of call detail records (CDRs) 116. As will be described in more detail below with reference to the following figures, the CDRs 116 may contain information relating to a particular voice communication session, including, without limitation, information specifying the GBR bandwidth that is reserved (or negotiated) for the voice communication session, a RAT type value, and a Quality of Service Class Indicator (QCI) value that can be used to specify whether the communication session is using VoLTE or another communication protocol.

According to various embodiments, a computing device(s) 118 may be configured (via one or more processors executing instructions stored in memory of the computing device 118) to carry out a process 120 to determine a breakdown of VoLTE calls by AMR speech coding modes that are utilized for the VoLTE calls.

At 122, the computing device 118 may access a plurality of CDRs 116 via the network(s) 110 and may filter the CDRs 116 to obtain a subset of the CDRs 116 that are associated with communication sessions that used VoLTE services. As noted above, the CDRs 116 may contain information such as a QCI value that, if set to a particular value (e.g., QCI=1), indicates that the communication session used VoLTE protocol. Thus, the filtering at 122 may comprise filtering the CDRs 116 according to a predetermined QCI value indicative of VoLTE-based communication sessions. The CDRs 116 may additionally include bandwidth information, such as an amount of bandwidth (e.g., 49,000 bits per second (bps)) requested for the corresponding communication sessions.

At 124, the computing device 118 may reference correlations 126 between AMR speech coding modes and bandwidth values maintained in a data store (data structure). The data structure containing the correlations (or mappings) 126 between AMR speech coding modes and bandwidth values may be created and maintained in storage provided by the computing device 118, or by an external (third party) resource accessible to the computing device 118. The correlations 126 may allow for translating bandwidth information into AMR coding mode, which is useful because the particular AMR coding mode established for a communication session may not be readily apparent from the CDR 116 for that communication session.

At 128, the computing device 118 may classify the subset of CDRs 116 relating to VoLTE communication sessions into groups of different AMR speech coding modes based at least in part on the referencing of the correlations 126 at step 124.

At 130, the computing device 118 may output a recommendation comprising at least one of a capacity planning metric or a resource allocation metric based at least in part on numbers of the CDRs 116 that are classified within each of the groups of the different AMR speech coding modes. That is, the particular breakdown of VoLTE calls (e.g., what proportion or percentage of VoLTE calls utilize AMR-WB speech coding modes) may dictate the capacity planning and/or resource allocation metrics. The resource allocation metric may comprise a recommended amount of bandwidth to allocate to customers via available resources (e.g., physical radio equipment) and/or a recommended number of resources to allocate for purposes of serving the customers. If there are insufficient available resources for a projected demand from customers of the mobile telephony network, a capacity planning metric can be recommended that comprises a recommended number of resources to provide or install for serving the customers. In this manner, the process 120 allows for configuring and/or planning a more reliable and efficient cellular network.

Figure 2:
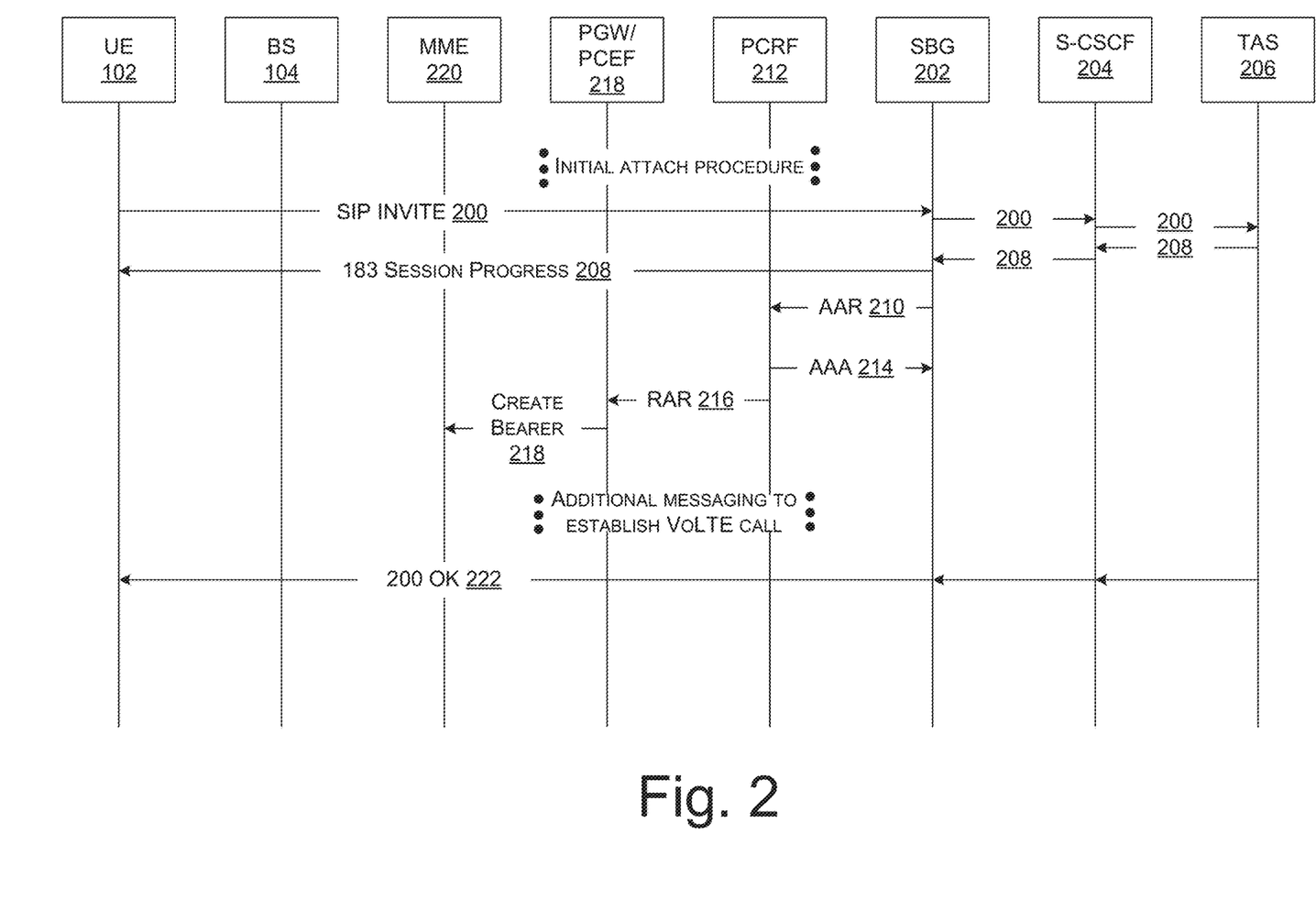
FIG. 2 is a diagram illustrating example signaling within the environment of FIG. 1 during a VoLTE-based communication session.

FIG. 2 is a diagram illustrating example signaling within the environment 100 of FIG. 1 during a VoLTE-based communication session. The signaling illustrated in FIG. 2 may be exchanged by various components of FIG. 1, including the UE 102, the base station 104, one or more components of the EPC 106, and one or more components of the MMTel and IMS architecture 108. FIG. 2 is provided for purposes of illustrating some of the information pertaining to a VoLTE communication that can be extracted and used for the techniques described herein.

For a VoLTE call to be initiated (e.g., the UE 102 calling another UE), an initial attachment procedure may be performed, which involves various operations including, but not limited to, determining that the LTE network is voice-capable, identifying a Proxy-Call Session Control Function (P-CSCF) of the MMTel and IMS architecture 108, and performing a registration for a packet-switched LTE network. The call may be initiated using a SIP INVITE method 200 transmitted via the EPC 106 for receipt by a session border gateway (SBG) 202, which is forwarded to a serving-CSCF (S-CSCF) 204 of the MMTel and IMS architecture 108. The S-CSCF 204 may generally be configured to provide routing services and to determine application servers (e.g., a telephony application server (TAS) 206) to which SIP messages are forwarded. The TAS 206 may be configured to provide various telephony services, such as call waiting, call forwarding, call conferencing, voicemail, and other types of services relating to communication sessions. The TAS 206 may return a 183 session progress message 208 to the S-CSCF 204 in response to the SIP INVITE 200. The S-CSCF 204 may forward the 183 session progress message 208 to the SBG 202, which may forward the 183 session progress message 208 to the UE 102.

The SBG 202 may also transmit an acknowledgement reservation request (AAR) message 210 to a policy charging and rules function (PCRF) 212 of the EPC 106. The SBG 202 may extract information, such as quality of service (QoS) information, based on the interaction with the TAS 206, and may include the extracted information in the AAR message 210. Accordingly, the AAR message 210 may include a media component description containing information, such as the Max-Requested-Bandwidth-UL (uplink), the Max-Requested-Bandwidth-DL (downlink), and other information describing the traffic flows being requested. For instance, a VoLTE call may request a Real-time Transport Protocol (RTP) flow or a RTP Control Protocol (RTCP) flow. RTP is a standardized packet format for delivering audio and video over IP networks. RTCP may be used to monitor transmission statistics and QoS, and may aid in the synchronization of multiple streams.

In general, the PCRF 212 creates and installs a set of charging and QoS rules for the media information received in the AAR message 210. The PCRF 212 may answer the AAR message 210 by transmitting an authentication and authorization answer (AAA) message 214 to the SBG 202.

The PCRF 212 may further generate and transmit a Re-Authenticate-Request (RAR) message 216 to a PGW/policy and charging enforcement function (PCEF) 218 of the EPC 106. The RAR message 216 may cause the installation of the charging rules created by the PCRF 212. A portion of an example charging rule corresponding to the RTP stream is provided in Table 2, below:

TABLE 2

Charging Rule for Audio RTP

| QCI | 1 |
|---|---|
| GBR-UL & GBR DL | 38000 |
| MBR-UL & MBR-DL | 38000 |

In the example portion of the charging rule of Table 2, the GBR bandwidth reserved for the VoLTE call is 38000 bps for the RTP stream (both for the uplink (UL) and downlink (DL) direction). Furthermore, the QCI value of 1 indicates that the specified QoS corresponds to a QoS used for VoLTE calls.

The PCEF portion of the PGW/PCEF 218 may perform QoS and charging rules analysis using the set of charging and QoS rules received from the PCRF 212 in the RAR message 216. The charging rules analysis may trigger the creation of a dedicated EPC, such as the EPC 106, and a dedicated bearer with a GBR bandwidth for voice traffic to/from the UE 102. As noted above, FIG. 1 illustrates the SIP signaling traffic 112 and voice traffic 114 over a dedicated bearer of the EPC 106.

In some embodiments, a create bearer request message 218 may be sent from the PGW/PCEF 218 to a mobility management entity (MME) 220 configured to, among other things, perform signaling for establishing bearer channels dedicated for the communication session with the UE 102. Accordingly, the create bearer request message 218 may cause the creation of the bearer traffic flow for the VoLTE call with the UE 102. The created bearer traffic flow may represent the traffic flow over which the voice call is implemented using VoLTE protocol. The amount of bandwidth required for the created bearer traffic flow may be calculated by the PGW portion of the PGW/PCEF 218 by aggregating the requested bandwidth of all the GBR flows in the charging rules created by the PCRF 212. This calculated bandwidth corresponds to the bandwidth allocated for the communication session on the RAN interface between the UE 102 and the base station 104.

Additional messages relating to the establishment of the VoLTE call, including AAA messages, re-authentication answer (RAA) messages, and the like, may be exchanged by the components of FIG. 2 to complete the establishment of the VoLTE call. When the call is determined to be authorized, a SIP 200 OK message 222 may be sent to the UE 102.

Figure 3:
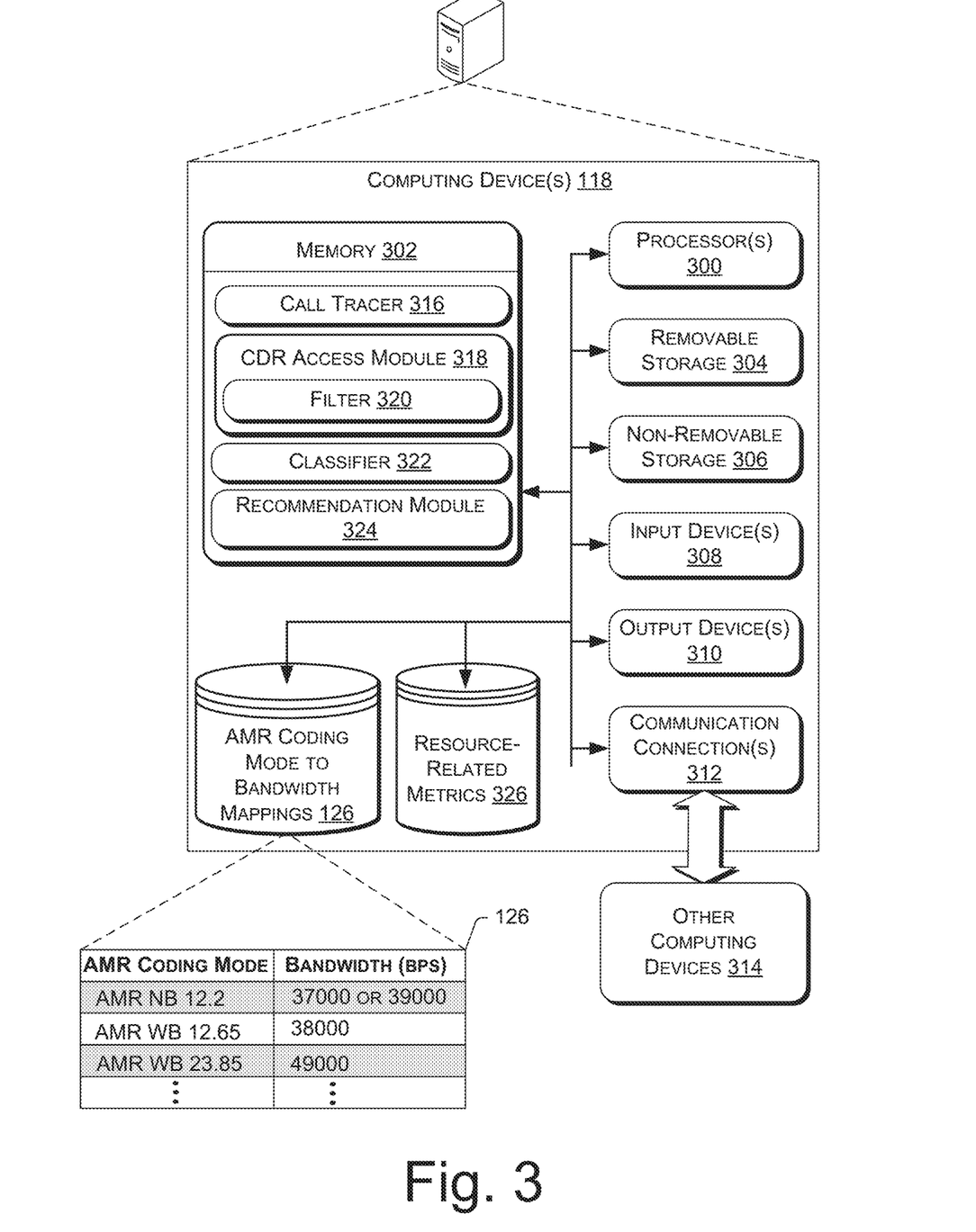
FIG. 3 is a block diagram of an example architecture of a computing device configured to implement the techniques described herein.

FIG. 3 is a block diagram of an example architecture of a computing device 118 configured to implement the techniques described herein. As shown, the computing device 118 may include one or more processors 300 and one or more forms of computer-readable memory 302. The computing device 118 may also include additional storage devices. Such additional storage may include removable storage 304 and/or non-removable storage 306.

In various embodiments, the computer-readable memory 302 generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 302 may also be described as computer storage media and may include volatile and nonvolatile, removable and non-removable media implemented in any method or technology for storage of information, such as computer readable instructions, data structures, program modules, or other data. Computer-readable memory 302, as well as the removable storage 304 and non-removable storage 306, are all examples of computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the computing device 118. Any such computer-readable storage media may be part of the computing device 118.

The computing device 118 may further include input devices 308, including, without limitation, a touch screen (e.g., touch, or proximity-based) display, physical buttons (e.g., keyboard or keypad), a microphone, pointing devices (e.g., mouse, pen, stylus, etc.), or any other suitable input devices 308 coupled communicatively to the processor(s) 300 and the computer-readable memory 302. The computing device 118 may further include output devices 310, including, without limitation, a display, one or more LED indicators, speakers, a printer, or any other suitable output device coupled communicatively to the processor(s) 300 and the computer-readable memory 302.

The computing device 118 may further include communications connection(s) 312 that allow the computing device 118 to communicate with other computing devices 314 such as via the network(s) 110 of FIG. 1. The communications connection(s) 312 may facilitate transmitting and receiving wireless and/or wired signals over any suitable communications/data technology, standard, or protocol, as described above, such as using a packet data network protocol.

In some embodiments, the computer-readable memory 302 may include various modules, programs, objects, components, data structures, routines, and the like that perform particular functions according to various embodiments. In some embodiments, the computer-readable memory 302 includes a call tracer 316 configured to trace VoLTE calls by accessing components of a mobile telephony network via the packet data network(s) 110 and extracting portions of the signaling shown in FIG. 2 in order to determine correlations between known AMR speech coding modes used for the VoLTE calls and the amount of bandwidth allocated for the VoLTE calls. In some embodiments, the call tracer 316 may, in the process of tracing a VoLTE call having a known AMR coding mode (e.g., AMR-WB coding mode "8" corresponding to 23.85 kbps), extract, from the trace, an amount of bandwidth allocated for the VoLTE call. As noted above with reference to FIG. 2, the amount of bandwidth required for the created bearer traffic flow of the VoLTE call may be calculated by the PGW portion of the PGW/PCEF 218 by aggregating the requested bandwidth of all the GBR flows in the charging rules created by the PCRF 212. This calculated bandwidth may be extracted by the call tracer 316 for purposes of establishing correlations between the allocated bandwidth and the known AMR speech coding mode for the VoLTE call. These correlations 126 are shown in FIG. 3 as a table listing different AMR coding modes mapped to corresponding bandwidth values. These correlations/mappings 126 may be and maintained in any suitable data structure, such as a database or any similar data repository, store, or the like, which may be accessed by the one or more processors 300, such as when referencing the correlations by lookup queries.

The computer-readable memory 302 may further include a CDR access module 318 configured to access the CDRs 116, which contain information associated with a plurality of communication sessions established over a mobile telephony network of the environment 100 of FIG. 1. The CDRs 116 may be maintained in a database or a similar data structure that allows for retrieving the CDRs 116 by the CDR access module 318 via the network(s) 110.

The CDR access module 318 may further include a filter 320 configured to filter the accessed CDRs 116 in order to obtain a subset of CDRs 116 that are associated with communication sessions that used VoLTE services. The filtering performed by the filter 320 may involve multiple filtering steps that include filtering on various criteria, as will be described in more detail below. For instance, the filter 320 may filter on a RAT type value that indicates the type of RAT utilized for the communication sessions, a QCI value that can be used for separating VoLTE communication sessions from pure data sessions (i.e., non-voice communication sessions), call duration, bearer release information, and/or allocated bandwidth information.

The computer-readable memory 302 may further include a classifier 322 configured to reference a database containing the correlations/mappings 126 between AMR speech coding modes and bandwidth values, and to classify the filtered set of CDRs 116 into groups of different AMR speech coding modes based on the referenced correlations 126. For example, an individual CDR 116 that survives the filtering of the filter 320 may specify that a bandwidth of 49000 bps was allocated for a corresponding VoLTE communication session. In this example, the classifier 322 may reference the correlations 126 to lookup the bandwidth value of 49000 bps and to correlate the CDR 116 in question to the AMR speech coding mode "8" for 23.85 kbps. Thus, the individual CDR 116 in this example may be classified within a group corresponding to "AMR-WB 23.85," although this label is merely illustrative and other group labels may be used for the different AMR speech coding mode groups. Additionally, or alternatively, the CDRs 116 may be classified according to the bandwidth that is allocated and/or requested for the VoLTE call prior to any referencing of the correlations/mappings 126. That is, the CDRs 116 may additionally, or alternatively, be classified by allocated or requested bandwidth. An example result of classifying the filtered CDRs 116 according to bandwidth requested for the corresponding communication sessions is shown below in Table 3:

TABLE 3

| Classified CDRs (VoLTE sessions) | |
|---|---|
| Max-Requested-Bandwidth-UL & Max-Requested-Bandwidth-DL (bps) | Count of Occurrences (# of CDRs) |
| 37000 | 12852 |
| 39000 | 5911 |
| 38000 | 2703 |
| 49000 | 2328 |

By referencing the correlations 126 between AMR coding mode and bandwidth values, the bandwidth data in the left column of Table 3 can be translated to a particular AMR speech coding mode (e.g., 49000 bps=AMR WB 23.85 kbps), and thus, a breakdown of VoLTE communication sessions by AMR speech coding mode can be obtained based on the bandwidth information associated with each CDR 116. Because VoLTE communication sessions can utilize both wide band and narrow band codecs (i.e., AMR-WB and AMR), an entity may gain insight into the proportion or percentage of VoLTE calls that utilize HD voice (i.e., AMR-WB coding modes), which may be a valuable insight for the entity (e.g., a carrier).

The computer-readable memory 302 may further include a recommendation module 324 configured to recommend a capacity planning metric or a resource allocation metric based at least in part on numbers of the CDRs 116 in the filtered subset of CDRs 116 that are classified within each of the groups of the different AMR speech coding modes. In order to output a recommended resource allocation or capacity planning metric, the recommendation module 324 may be configured to access information pertaining to resource-related metrics 326, such as data that indicates a number of resources (e.g., physical radio equipment, such as base station 104 equipment) required to provision a particular amount of bandwidth for purposes of serving customers of a mobile telephony network. In this sense, the recommendation module 324 may be configured to analyze the numbers of classified CDRs 116 output by the classifier 322 (e.g., proportions of VoLTE calls utilizing the AMR-WB codec versus proportions of VoLTE calls utilizing the narrowband AMR codec) to predict or project an amount of bandwidth needed to serve customers of the mobile telephony network over some future period of time (e.g., the next several months). Based on this projected bandwidth demand over the future period of time, the recommendation module 324, with access to the resource-related metrics 326, may determine whether the existing infrastructure of the cellular network can accommodate the anticipated bandwidth demand, and/or whether a number of resources (e.g., radio equipment) can be allocated for providing that bandwidth demand. In this scenario, the resource allocation metric recommended by the recommendation module 324 may comprise a particular number of resources to allocate for purposes of serving customers of a mobile telephony network. Alternatively, if the recommendation module 324 determines that the number of available resources is insufficient for providing the projected bandwidth, a capacity planning metric may be output by the recommendation module 324, which may comprise a particular number of resources that are to be added to the existing infrastructure of resources, which will accommodate the predicted bandwidth demand of the customers over the future period of time.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
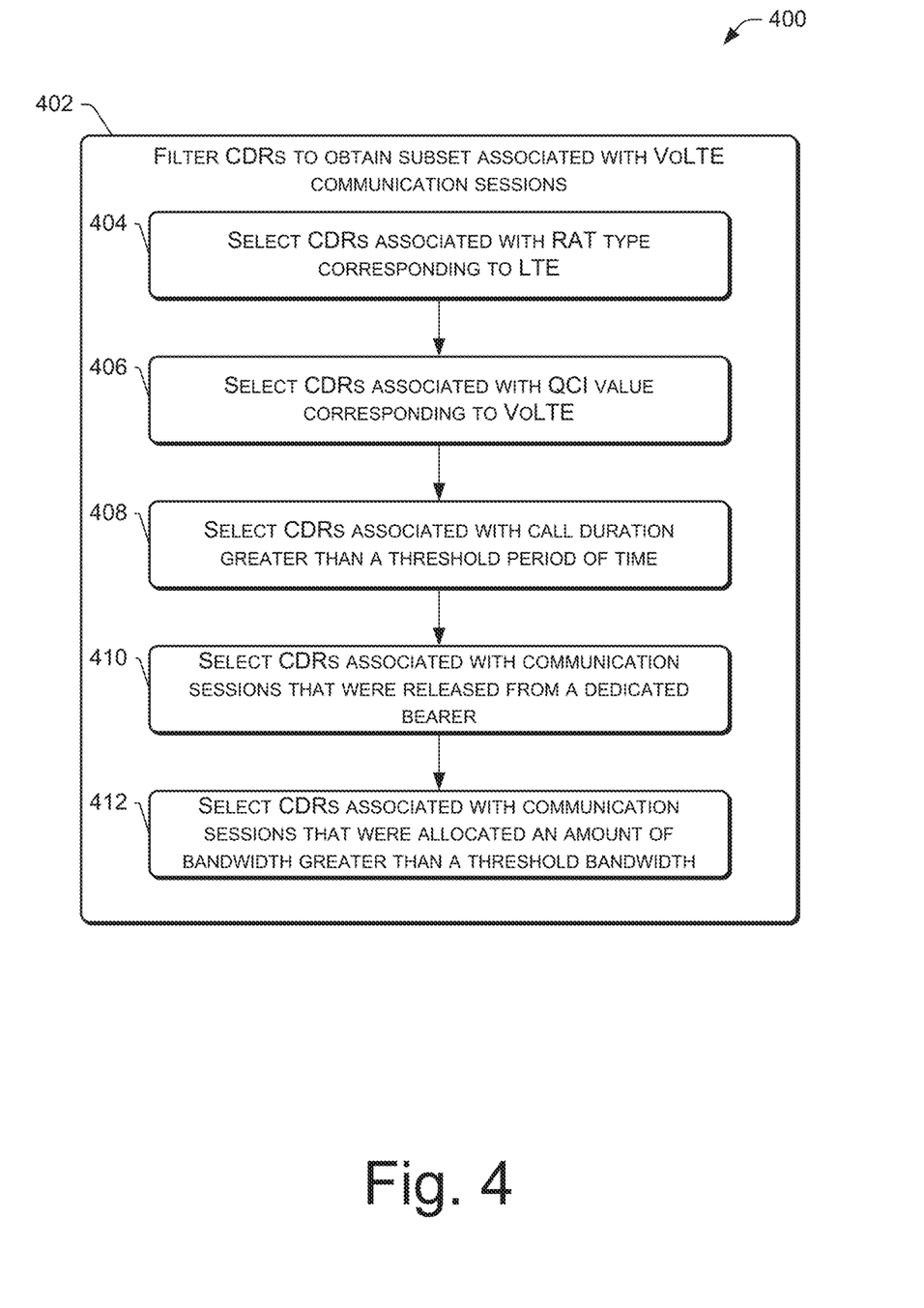
FIG. 4 illustrates a flowchart of an example process for filtering call detail records (CDRs) to obtain a subset of CDRs of interest that pertain to VoLTE communication sessions.

FIG. 4 illustrates a flowchart of an example process 400 for filtering CDRs 116 to obtain a subset of CDRs 116 of interest that pertain to VoLTE communication sessions. The process 400 may represent a sub-process of the process 120 described with reference to FIG. 1. The process 400 may be implemented by the computing device(s) 118 via the filter 320 to obtain the subset of CDRs 116 that are ultimately classified by the classifier 322 at step 128 of the process 120.

At 402, CDRs 116 that have been accessed by the CDR access module 318 may be filtered to obtain a subset of CDRs 116 that are associated with VoLTE communication sessions. The subset of CDRs 116 may also satisfy one or more additional criteria implemented by the filter 320 via sub-steps 404-412 of the process 400.

At 404, the filter 320 may select a first set of CDRs 116 that are associated with communication sessions that used a LTE RAT. In some embodiments, the filter 320 may filter on a RAT type value specified in the CDRs 116 that is indicative of whether an LTE RAT was used for a communication session associated with the CDRs 116. For example, RAT type=6 may indicate an LTE RAT, whereas other RAT type values may indicate other types of RATs (e.g., WiFi 2.0, GPRS Serving Node (GSN), Gateway GSN (GGSN), etc.). Accordingly, the filter 320 may filter the CDRs 116 by RAT type to obtain CDRs 116 that are based on LTE.

At 406, the filter 320 may select, from the first set of CDRs 116 that remain after the filtering at 404 (i.e., the LTE-based CDRs 116), a second set of CDRs 116 that are associated with communication sessions having a QCI value specified in the CDRs 116 that corresponds to VoLTE. In particular, the filtering at 406 may filter out LTE data traffic so that the remaining CDRs 116 pertain to VoLTE (i.e., voice) traffic. In some embodiments, the filter 320 may keep CDRs 116 specifying that QCI=1, which ensures that the CDRs 116 remaining after the filtering at 406 are those that are associated with communication sessions that used VoLTE protocol.

At 408, the filter 320 may select, from the second set of CDRs 116 that remain after the filtering at 406 (i.e., VoLTE-based CDRs 116), a third set of CDRs 116 that are associated with communication sessions having call durations specified in the CDRs 116 that are greater than a threshold period of time (e.g., greater than 0 seconds). The effect of the filtering at 408 is that individual ones of the CDRs 116 associated with calls that were made, but not completely answered, are removed from consideration. For example, if the UE 102 initiates a call to another UE, but the user of the UE 102 decides to hang up or otherwise stop the call before it is answered, the CDR 116 associated with that communication session (which would not have exceeded the threshold period of time) can be filtered out at 408. One reason why it is useful to filter out such CDRs 116 is because a certain AMR speech coding mode (e.g., AMR-WB 23.85 kbps) may be pre-negotiated for every VoLTE call, but after some re-negotiation (which may be based on the capabilities of the UE being called), the AMR speech coding mode that is designated for the VoLTE call may comprise a narrow band coding mode (e.g., AMR NB 12.2 kbps). Thus, the bandwidth indicated in a CDR 116 associated with a communication session having a call duration less than the threshold period of time may not accurately represent the codec that would otherwise have been established for the VoLTE call.

At 410, the filter 320 may select, from the third set of CDRs 116 that remain after the filtering at 408 (i.e., CDRs 116 associated with communication sessions lasting longer than the threshold call duration), a fourth set of CDRs 116 associated with communication sessions that were released from a dedicated bearer of the communication sessions corresponding to the fourth set of CDRs 116. Information pertaining to whether a VoLTE call was released from a dedicated bearer may be specified in the CDR 116 for that VoLTE call, and as such, the filter 320 may filter on this information to remove VoLTE calls that were not released properly. In other words, the filtering at 410 results in CDRs 116 associated with communication sessions that were properly terminated (e.g., hung up) on the AMR codecs established for the communication sessions. This ensures that the CDRs 116 remaining after the filtering at 410 are those CDRs 116 associated with calls that were established and the parties to the call actually talked over the established speech codec.

At 412, the filter 320 may select, from the fourth set of CDRs 116 that remain after the filtering at 410, a fifth set of CDRs 116 associated with communication sessions that were allocated an amount of bandwidth specified in the CDRs 116 that is greater than a threshold bandwidth. The threshold bandwidth may be set at any suitable value. In some embodiments, the threshold bandwidth is set at 30000 bps, which ensures that CDRs 116 associated with communication sessions that were allocated lesser bandwidth (e.g., communication sessions involving dual-tone multi-frequency (DTMF) tones) are eliminated. The set of CDRs 116 resulting from the process 400 comprise an example set of CDRs 116 that may be classified into groups based on allocated bandwidth and/or based on the particular AMR speech coding mode utilized for the corresponding communication sessions.

Figure 5:
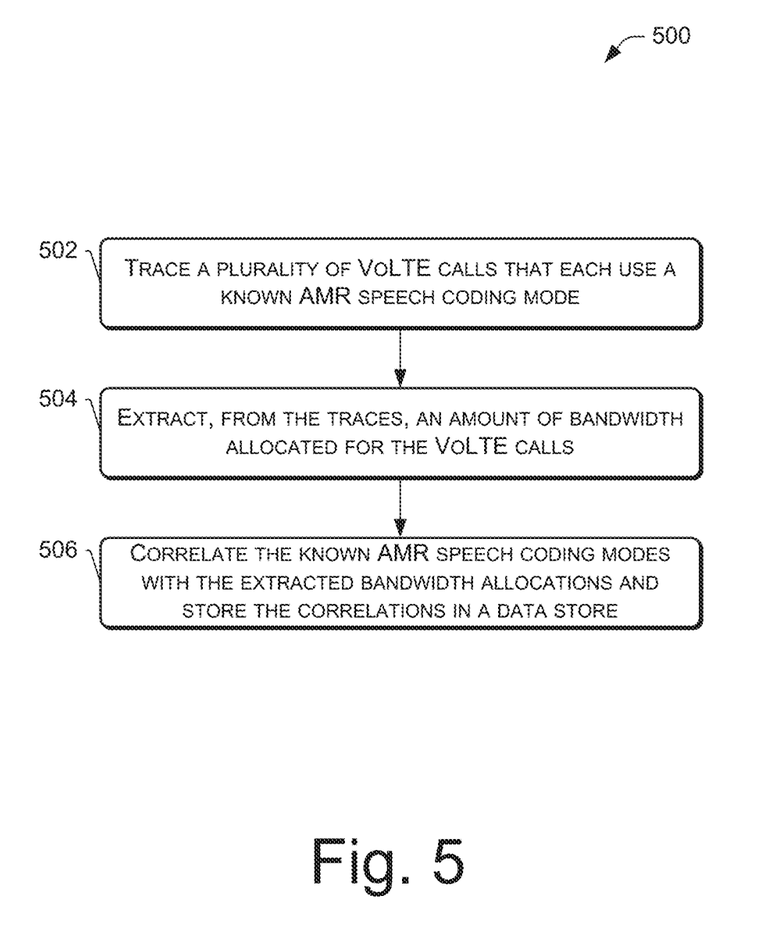
FIG. 5 illustrates a flowchart of an example process for establishing correlations between AMR speech coding modes and bandwidth values.

FIG. 5 illustrates a flowchart of an example process 500 for establishing correlations between AMR speech coding modes and bandwidth values. The process 500 may be implemented by the computing device(s) 118 via the call tracer 316 to establish the correlations/mappings 126 that are utilized in the process 120 of FIG. 1.

At 502, the call tracer 316 may trace a plurality of VoLTE calls, each of the plurality of VoLTE calls using a known AMR speech coding mode. Any suitable tracing technique can be employed by the call tracer 316 at 502, such as session analyzer software to extract relevant data from the signals that are transmitted during a VoLTE communication session.

At 504, the call tracer 316 may extract, from a trace of the VoLTE call, an amount of bandwidth allocated for the VoLTE call. As noted above, the amount of bandwidth required for the created bearer traffic flow may be calculated by the PGW portion of the PGW/PCEF 218 of FIG. 2, such as by aggregating the requested bandwidth of all the GBR flows in the charging rules created by the PCRF 212. This calculated bandwidth corresponds to the bandwidth allocated for the communication session on the RAN interface between the UE 102 and the base station 104, and may be the bandwidth extracted by the call tracer 316 at step 504.

At 506, the known AMR speech coding mode for a VoLTE call may be correlated with the amount of bandwidth extracted at 504 for the VoLTE call in question, and the correlation may be stored in a data store (e.g., a database storing the mappings/correlations 126). In this manner, a plurality of mappings 126 between AMR coding mode and bandwidth may be established for corresponding VoLTE calls that are traced. In some embodiments, a correlation may be established between a bandwidth value and an AMR speech coding mode after a threshold amount of VoLTE calls with that association have been traced using the process 500. Setting a threshold number of VoLTE calls to establish a mapping/correlation between an AMR speech coding mode and a particular bandwidth value may validate the relationship between the AMR speech coding mode and the bandwidth value and may serve a quality control function in that regard.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:

1. A system comprising:
   one or more processors; and
   memory storing computer-executable instructions that, when executed by the one or more processors, cause the system to:
      trace a plurality of calls, each of the plurality of calls using a known adaptive multi-rate (AMR) speech coding mode;
      for individual ones of the plurality of calls, correlate the known AMR speech coding mode with an amount of bandwidth allocated for the call to create correlations between AMR speech coding modes and bandwidth values in a data structure;
      reference the data structure containing the correlations between the AMR speech coding modes and the bandwidth values; and
      classify a plurality of call detail records (CDRs) into groups of different AMR speech coding modes based at least in part on referencing the data structure.

2. The system of claim 1, wherein the plurality of CDRs comprises a subset of CDRs maintained in a database, and wherein the computer-executable instructions, when executed by the one or more processors, further cause the system to, prior to classifying the plurality of CDRs:
   access the database maintaining the CDRs; and
   filter the CDRs to obtain the plurality of CDRs.

3. The system of claim 2, wherein filtering the CDRs comprises filtering the CDRs by bandwidth allocation such that the plurality of CDRs are associated with communication sessions that were allocated an amount of bandwidth greater than a threshold bandwidth.

4. The system of claim 2, wherein filtering the CDRs comprises filtering the CDRs by a radio access technology (RAT) type value that corresponds to a long term evolution (LTE) RAT.

5. The system of claim 2, wherein filtering the CDRs comprises filtering the CDRs by a Quality of Service Class Indicator (QCI) value that corresponds to voice over long term evolution (VoLTE).

6. The system of claim 2, wherein filtering the CDRs comprises filtering the CDRs by session duration such that the plurality of CDRs are associated with communication sessions having session durations greater than a threshold period of time.

7. The system of claim 2, wherein filtering the CDRs comprises filtering the CDRs by information indicating a successful bearer release such that the plurality of CDRs are associated with communication sessions that were released from a bearer of the communication sessions.

8. The system of claim 1, wherein:
   the plurality of calls comprise a plurality of voice over long term evolution (VoLTE) calls; and
   for the individual ones of the plurality of calls, the amount of the bandwidth allocated for the call is extracted from a trace of the VoLTE call.

9. The system of claim 1, wherein the computer-executable instructions, when executed by the one or more processors, further cause the system to recommend a resource allocation metric based at least in part on numbers of the plurality of CDRs within each of the groups of the different AMR speech coding modes, and wherein the resource allocation metric comprises a recommended amount of bandwidth for serving customers of a mobile telephony network over a future period of time and a recommended number of available resources for providing the recommended amount of bandwidth.

10. The system of claim 1, wherein the computer-executable instructions, when executed by the one or more processors, further cause the system to recommend a capacity planning metric based at least in part on numbers of the plurality of CDRs within each of the groups of the different AMR speech coding modes, and wherein the capacity planning metric comprises a recommended number of new resources for providing service to customers of a mobile telephony network.

11. A computer-implemented method comprising:
   tracing a plurality of calls, each of the plurality of calls using a known adaptive multi-rate (AMR) speech coding mode;

for individual ones of the plurality of calls, correlating the known AMR speech coding mode with an amount of bandwidth allocated for the call to create correlations between AMR speech coding modes and bandwidth values in a data structure;

referencing the data structure containing the correlations between the AMR speech coding modes and the bandwidth values; and classifying a plurality of call detail records (CDRs) into groups of different AMR speech coding modes based at least in part on the referencing.

12. The computer-implemented method of claim 11, wherein the plurality of CDRs comprises a subset of CDRs maintained in a database, the computer-implemented method further comprising, prior to the classifying:

accessing the database maintaining the CDRs; and filtering the CDRs to obtain the plurality of CDRs.

13. The computer-implemented method of claim 12, wherein the filtering comprises filtering the CDRs by bandwidth allocation such that the plurality of CDRs are associated with communication sessions that were allocated an amount of bandwidth greater than a threshold bandwidth.

14. The computer-implemented method of claim 12, wherein the filtering comprises filtering the CDRs by a Quality of Service Class Indicator (QCI) value that corresponds to voice over long term evolution (VoLTE).

15. The computer-implemented method of claim 12, wherein the filtering comprises filtering the CDRs by session duration such that the plurality of CDRs are associated with communication sessions having session durations greater than a threshold period of time.

16. A computer-implemented method comprising:

tracing a plurality of calls, each of the plurality of calls using a known adaptive multi-rate (AMR) speech coding mode;

for individual ones of the plurality of calls, correlating the known AMR speech coding mode with an amount of bandwidth allocated for the call to create correlations between AMR speech coding modes and bandwidth values;

storing the correlations between the AMR speech coding modes and the bandwidth values as stored correlations; and classifying, based at least in part on the stored correlations, a plurality of call detail records (CDRs) by AMR speech coding mode to obtain classified CDRs.

17. The computer-implemented method of claim 16, further comprising filtering, prior to the classifying, a database of CDRs to obtain the plurality of CDRs, wherein the filtering comprises:

filtering the database of CDRs by a radio access technology (RAT) type value that corresponds to a long term evolution (LTE) RAT to obtain a first subset of CDRs;

filtering the first subset of CDRs by a Quality of Service Class Indicator (QCI) value that corresponds to voice over long term evolution (VoLTE) to obtain a second subset of CDRs;

filtering the second subset of CDRs by session duration to obtain a third subset of CDRs associated with communication sessions having durations greater than a threshold period of time;

filtering the third subset of CDRs by information indicating a successful bearer release to obtain a fourth subset of CDRs associated with communication sessions that were released from a bearer of the communication sessions; and filtering the fourth subset of CDRs by bandwidth allocation to obtain the plurality of CDRs associated with communication sessions that were allocated an amount of bandwidth greater than a threshold bandwidth.

18. The computer-implemented method of claim 16, further comprising recommending a capacity planning metric or a resource allocation metric based at least in part on the classified CDRs.

19. The computer-implemented method of claim 18, further comprising determining a number of the classified CDRs that are associated with a particular AMR speech coding mode, wherein the recommending the capacity planning metric or the resource allocation metric is based at least in part on the number of the classified CDRs that are associated with the particular AMR speech coding mode.

20. The computer-implemented method of claim 16, wherein the plurality of calls comprise a plurality of voice over long term evolution (VoLTE) calls, the method further comprising, for the individual ones of the plurality of calls, creating the stored correlations by:

extracting, from a trace of the VoLTE call, the amount of the bandwidth allocated for the VoLTE call.

* * * * *